Jan. 24, 1950     R. M. NARDONE     2,495,470
VARIABLE SPEED DRIVE

Filed May 23, 1946     3 Sheets-Sheet 1

INVENTOR.
Romeo M. Nardone

BY Cousins & Cousins
ATTORNEYS,

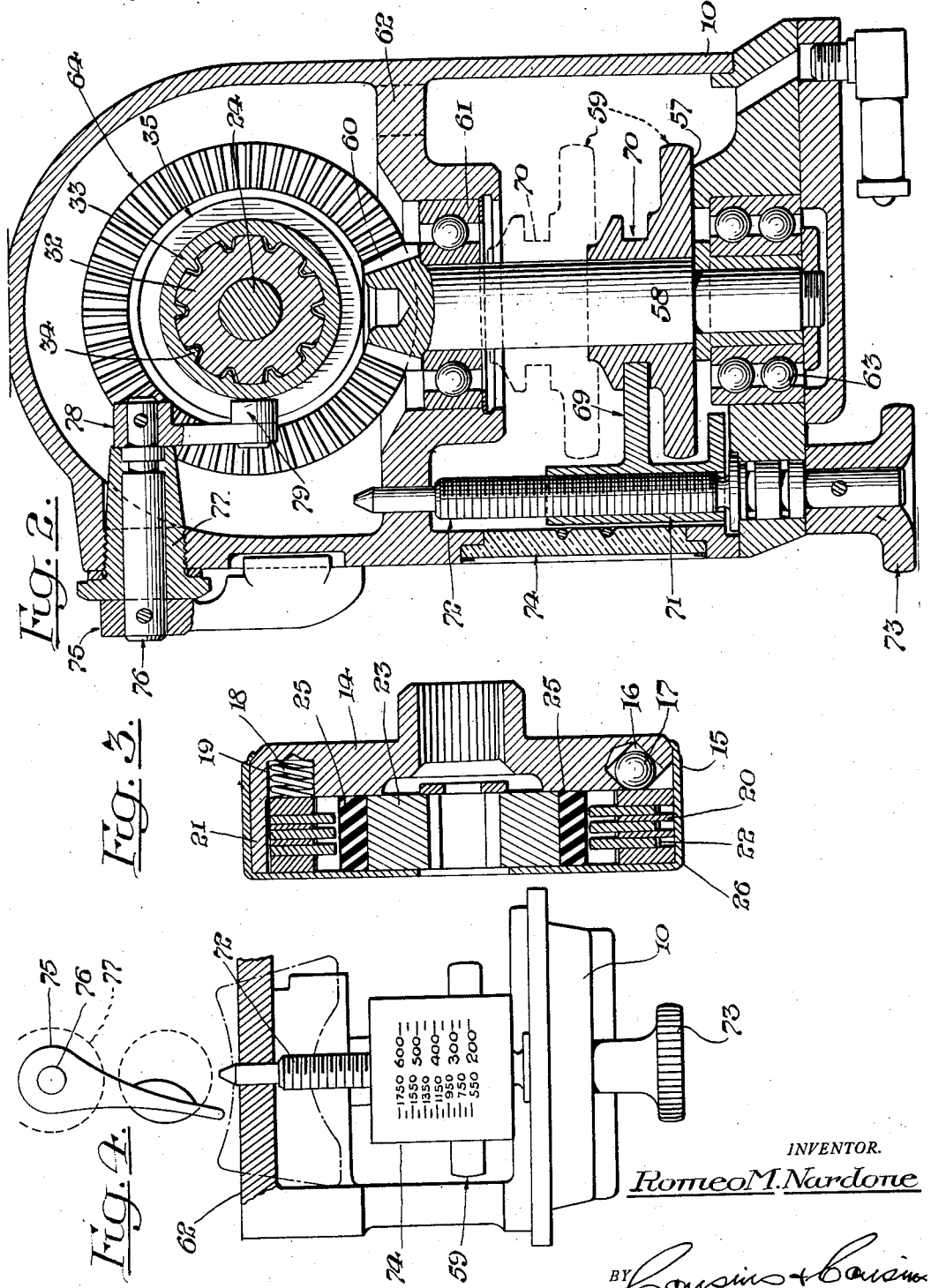

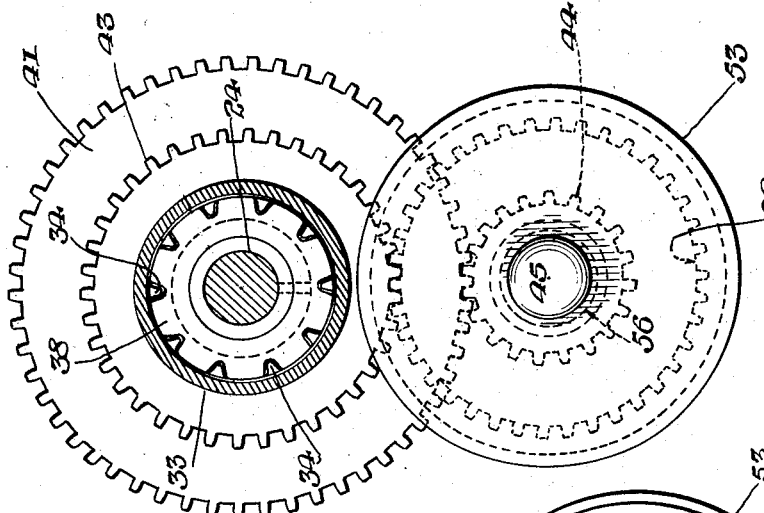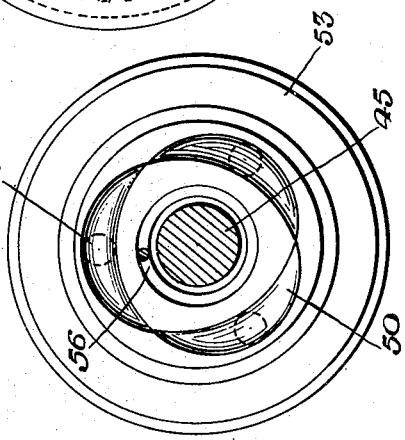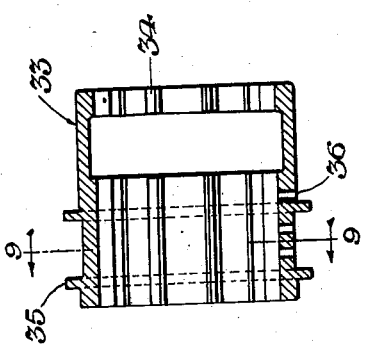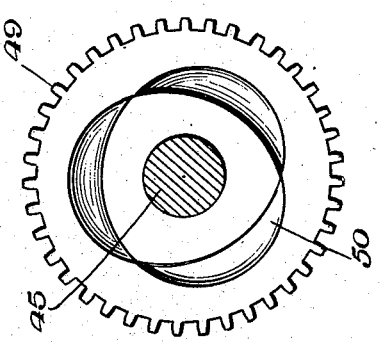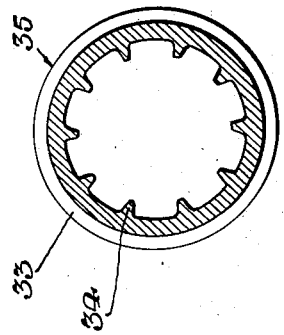

Patented Jan. 24, 1950

2,495,470

UNITED STATES PATENT OFFICE 2,495,470

VARIABLE-SPEED DRIVE

Romeo M. Nardone, Teaneck, N. J., assignor to Joseph J. Mascuch, Millburn, N. J.

Application May 23, 1946, Serial No. 671,786

1 Claim. (Cl. 74—194)

This invention relates to variable speed drive mechanisms such as are attached to constant speed motors to vary their shaft speed output.

The broad object of this invention is to provide a light, compact device whereby a large range of shaft speeds may be derived from any given motor.

Another object of this invention is to produce the speed variations in two stages thereby reducing the required size of the unit.

A feature of this invention is the novel method of moving the driven ring and hub with respect to the driving face.

A further feature of this invention is the centrifugal flexible type clutch used to transmit the rotary motion from the motor to the drive mechanism.

Another object of this invention is to provide a device whereby a large number of speeds may be selected by the manipulation of only two controls.

A more specific object of this invention is to vary the speed of constant speed motors operating at around 1700 R. P. M. between 200 R. P. M. and 1700 R. P. M.

The invention consists of the construction, combination and arrangement of parts, as herein illustrated, described and claimed.

In the accompanying drawings, forming part hereof, is illustrated one form of embodiment of the invention, in which drawings similar reference characters designate corresponding parts, and in which:

Figure 2 is a cross-section of the variable speed mechanism, taken on line 2—2 of Figure 1.

Figure 3 is a longitudinal section of the centrifugal clutch.

Figure 4 is a fragmentary view, partly in elevation, of the control mechanism of the invention.

Figure 5 is a view taken on line 5—5 in Figure 1, looking in the direction indicated by the arrows.

Figure 6 is a view in elevation of the pinion gear.

Figure 7 is a view in elevation of the driving plate.

Figure 8 is a longitudinal section of the speed shifting sleeve member.

Figure 9 is an end view of the sleeve shown in Figure 8.

Figure 1:
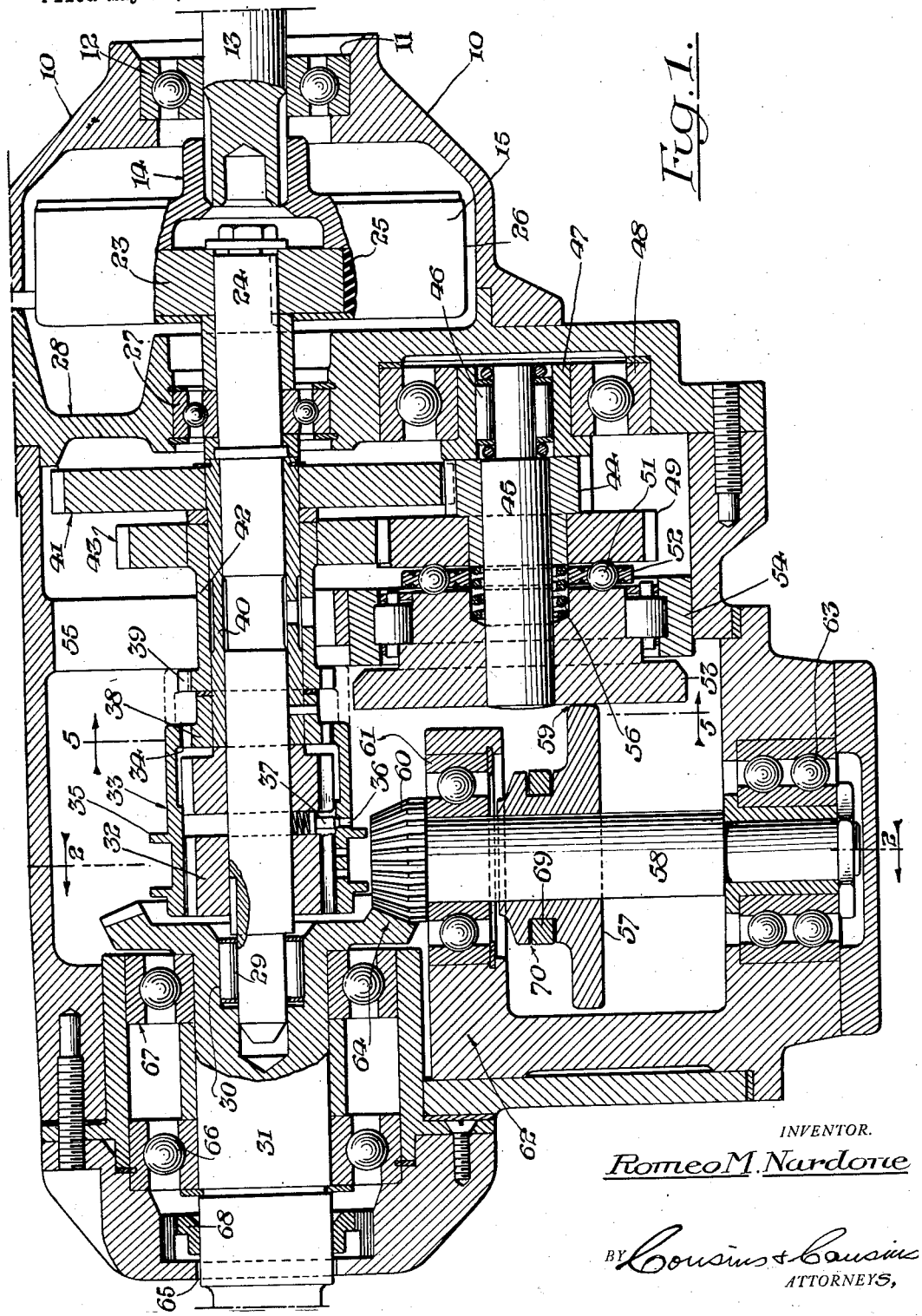
Figure 1 is a longitudinal section of a complete embodiment of the invention.

Referring to the drawings, and particularly Figure 1, 10 indicates a metal housing shell provided with an opening 11 at its right hand end. A ball bearing 12 is mounted within the opening 11 to rotatably support the shaft 13 of a constant speed motor (not shown). A driving plate 14 is splined to the shaft 13 within the shell 10. The plate 14 comprises part of a centrifugal flexible type of clutch 15, best shown in Figure 3.

The clutch member 15 is held to the motor shaft 13 by the plate 14. A plurality of holes 16 are drilled in the face of the plate 15 at a 45° angle to the axis thereof and around its rim. Each hole 16 contains a steel ball 17 freely sliding therein. A plurality of equally spaced holes 18 are also located at intervals around the plate rim. These holes 18 are drilled parallel to the axis of the plate 14 and seat coil springs 19 to maintain the alignment of the clutch plates 20, 22. The holes 16 drilled into the face of the plate 14 divide its peripheral rim into a plurality of segments into which the steel balls 17 can roll.

The clutch plates 20, 22 are slipped into the socket formed by the driving plate 14 and its peripheral rim 21. The outer clutch plates 20 are notched to receive the segments of the rim. In this manner the steel balls 17 come to bear upon the plates 20 when they roll toward the openings of their bores 16. Each inner clutch plate 22 is internally splined and engages a hub 23 which is keyed to the input shaft 24 of the variable speed drive. A rubber ring 25 is interposed between the clutch discs 22 and the hub 23 and is bonded to the said hub. A retaining cup 26 completes the clutch assembly and slips over the driving plate 14 so as to enclose the clutch.

The input shaft 24 of the variable speed drive is supported at its motor end in a ball bearing 27 which is mounted in a transverse wall 28 of the housing 10, as shown in Figure 1. The opposite end of the shaft 24 is rotatably held by needle bearings 29 mounted in a socket 30 in the output shaft 31 of the unit. Splined to the output end of the input shaft 24 is an externally toothed gear member 32 which carries a sleeve 33, shown in detail in Figures 8 and 9. The sleeve 33 is provided with internal teeth 34 and two spaced annular collars 35. Three positioning bores 36 are drilled in the sleeve 33 and receive a spring pressed detent 37 which is held by the gear member 32. The sleeve 33 is movable endwise so that its teeth 34 can engage either of two transmission gears 38, 39.

The high speed transmission gear 38 is pressed and pinned to the hollow shaft 40 which has a driving gear 41 at the other end thereof. The low speed transmission gear 39 is integral with a sleeve 42, upon the other end of which is keyed the low speed driving gear 43. The sleeve 42 rotates upon the hollow shaft 40, which in turn is freely mounted upon the input shaft 24.

A pinion 44, freely rotatable upon a drive shaft 45, is meshed with the high speed gear 41 at all times. The shaft 45 is mounted in needle bearings 46 on its motor end, and the housing 47 thereof journaled in a roller bearing 48 which is supported by the transverse wall 28. A low speed driven gear 49 is attached to the pinion 44 in such manner that it may be considered part of the said pinion 44. This gear 49 is in mesh with the low speed driving gear 42 at all times.

The output or left hand face of the low speed driven gear 49 is provided with three arcuate grooves 50, best shown in Figure 6. A steel ball 51 is slidably retained within each of these grooves 50 for a hereinafter described purpose. A retainer 52 adjacent the low speed gear 49 holds the steel balls 51 against the gear 49 and in fixed relationship with each other. The left hand face of the retainer 52 lies parallel to a driving plate 53. The shaft 45 is pressed into the driving plate 53 so as to be part thereof. The plate 53, and consequently the output end of the shaft 45, are supported by a roller bearing 54, held by a wall 55 mediate the housing shell 10. The right hand face of the driving plate 53, shown in Figure 7, has milled therein three arcuate grooves 50 identical to those in the low speed gear 49, and for the same purpose. A coil spring 56, slipped over the drive shaft 45, separates the gear 49 and the plate 53.

By referring again to Figure 1, it can be seen that a driven ring 57 is held by a shaft 58 so that its edge 59 bears against the plate 53. The upper end of the shaft 58 is provided with a beveled pinion 60 integral therewith. Bearings 61, held by a transverse brace 62 of the housing 10, support the shaft 58 at its upper end. The bottom of the shaft 58 is rotatably held by a ball bearing 63 which is mounted upon the housing shell 10. A bevel gear 64, integral with the right hand end of the output shaft 31, is in mesh with the pinion 60. The output shaft 31 projects through an opening 65 in the housing shell 10, and is supported by roller bearings 66, 67 held within the said shell. An oil seal 68 located adjacent the opening 65 prevents foreign material from entering the drive mechanism.

As indicated, in dotted lines in Figure 2, the driven ring 57 may be moved up and down upon the shaft 58 to which it is keyed. This motion is the result of the operation of a yoke 69 which engages a groove 70 of the ring 57. The said yoke 69 is integral with an internally threaded sleeve 71 which is engaged by a worm 72. Rotation of a knob 73, attached to the worm 72, causes the yoke 69 to raise or lower the driven ring 57. This in turn causes the edge 59 of the said ring to bear upon the driving plate 53 at various distances from the center of said plate 53.

A transparent window 74, shown in Figure 4, is located in the shell housing 10 opposite the yoke 69. Numbers designating the speed of the output shaft are inscribed on the said window. Thus the yoke 69 may be moved up or down until its position coincides with the desired speed of the output shaft indicated by the numbers on the window 74. At this point the unit will deliver one of two speeds, depending upon the setting of the second control lever 75, shown in Figure 2.

The control lever 75 is located above the window 74 on the housing shell 10. It is pinned to a shaft 76 which is rotatably held by a nut 77 in the housing 10. An arm 78 is secured to the end of the shaft 76 and is provided with a shoe 79 for the purpose of engaging the sleeve 33. The shoe 79 fits within the space provided between the two collars 35 on the sleeve 33 and translates the rotation of the control lever 75 into endwise movement of the sleeve 33.

The operation of the variable speed drive becomes apparent from the foregoing description of its construction. When the constant speed motor is energized it rotates its shaft 13, causing the driving plate 14 attached to it, to revolve. The steel balls 17 in the sockets 16 of the plate 14 are forced to the outer extremity thereof by reason of centrifugal force. The pressure of the steel balls 17 upon the clutch plates 20, 22 transmits the drive from the motor shaft 13 to the input shaft 24 of the variable speed drive. The input shaft 24 turns the gear member 32 attached thereto and also the sleeve 33 splined to the outside of the gear 32. The sleeve teeth 34 engage one of the transmission gears 38, 39, depending upon the position of the control lever 75. The motion of the engaged transmission gear is transferred to its driving gear and from there to either the pinion 44 or the driven gear 49 as the case may be.

The driven gear 49 is accordingly revolved at one of two possible speeds. The steel balls 51 held by the retainer 52 are forced, by the revolution of the driven gear 49, toward the narrow ends of the arcuate grooves 50. The space maintained between the driven gear 49 and the driving plate 53 by the coil spring 56 is now bridged by the steel balls 51 and the power from the driven gear 49 transmitted to the driving plate 53.

Since the driving plate 53 bears against the edge of the driven ring 57, it drives it by the friction of the butting surfaces. It is elementary that the speed of rotation of the ring 57 may be varied without changing the rate of rotation of the driving plate 53, by moving it closer to or away from the center thereof. Thus, for any setting of the control lever 75, a complete range of speeds may be secured by the expedient of turning the knob 73 and thereby changing the position of the ring 57 on the plate 53. By reversing the position of the control lever 75, a complete new range of speeds become available. The speed of the driven ring 57 is translated into rotation of the output shaft 31 by the operation of the pinion 60 and the bevel gear 64. The speed of the output shaft for any setting of the controls may be read directly on the window 74.

It is possible by providing the input shaft with a multiple speed motor, to further increase the range of available speeds of the output shaft 31. It is also within the purview of this invention to provide more than two possible speeds of the drive plate 53 by increasing the number of transmission gears within the unit.

Having thus fully described the invention, what is claimed as new and desired to be secured by Letters Patent of the United States, is:

In a variable speed drive for use with a source of rotary power, an input shaft, an output shaft, a centrifugal flexible clutch coupling the source of rotary power to the said input shaft, a multi-speed transmission driven by the input shaft, said transmission terminating in a ball and cam activated drive plate, a driven ring having its edge in frictional engagement with the face of the plate, said ring being geared to the output shaft, and means comprising a knob, a rotatable worm attached to the knob, a sleeve threaded upon the worm and a yoke attached to the sleeve, said yoke engaging the driven ring so as to radially adjust said ring for any desired setting upon the face of the drive plate.

ROMEO M. NARDONE.

REFERENCES CITED

The following references are of record in the file of this patent:

UNITED STATES PATENTS

| Number | Name | Date |
| --- | --- | --- |
| 876,337 | Demholter | Jan. 14, 1908 |
| 985,342 | Hardinge | Feb. 28, 1911 |
| 1,401,505 | Sykora | Dec. 27, 1921 |
| 1,417,950 | Smalley | May 30, 1922 |
| 2,107,089 | Swennes | Feb. 1, 1938 |
| 2,218,651 | Lenney | Oct. 22, 1940 |
| 2,370,199 | Schuckers | Feb. 27, 1945 |